United States Patent
Subramanian

(10) Patent No.: US 11,433,732 B1
(45) Date of Patent: Sep. 6, 2022

(54) ANTI-DIVE BAR SYSTEM WITH SELECTIVE FIXATION

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/353,046

(22) Filed: Jun. 21, 2021

(51) Int. Cl.
*B60G 21/00* (2006.01)

(52) U.S. Cl.
CPC ........ *B60G 21/002* (2013.01); *B60G 2400/50* (2013.01)

(58) Field of Classification Search
CPC .. B60G 21/002; B60G 21/023; B60G 21/045; B60G 21/103; B60G 2204/46; B60G 2204/81
See application file for complete search history.

(56) References Cited

U.S. PATENT DOCUMENTS

| | | | | |
|---|---|---|---|---|
| 2,850,290 A | * | 9/1958 | Borgmann | B60S 9/04 280/124.167 |
| 5,839,741 A | * | 11/1998 | Heyring | B60G 21/0553 280/124.167 |
| 6,217,047 B1 | * | 4/2001 | Heyring | B60G 21/073 280/124.106 |
| 8,317,208 B2 | * | 11/2012 | Bird | B60G 21/045 280/124.167 |
| 2004/0036244 A1 | * | 2/2004 | Kotulla | B60G 3/14 280/124.106 |

FOREIGN PATENT DOCUMENTS

| | | | | |
|---|---|---|---|---|
| DE | 102010021931 A1 | | 12/2011 | |
| EP | 1655159 A1 | * | 5/2006 | ............ B60G 11/24 |
| JP | 2012066629 A | * | 4/2012 | |

OTHER PUBLICATIONS

Eitel, Lisa "Shape-memory alloys linear actuators: A new option for positioning" Design World, Jul. 10, 2018, 17 pages, https://www.designworldonline.com/shape-memory-alloys-linear-actuators-a-new-option-for-positioning/#:~:text=Shape%2Dmemory%20alloys%20linear%20actuators%3A%20A%20new%20option%20for%20positioning,-By%20Lisa%20Eitel&text=Now%2C%20one%20new%20actuator%20uses,alloy%20for%20reliable%20linear%20motion.&text=Shape%2Dmemory%20alloys%20(SMAs),changes%20by%20changing%20form%20factor.

* cited by examiner

*Primary Examiner* — James A English
(74) *Attorney, Agent, or Firm* — Withrow & Terranova, PLLC

(57) ABSTRACT

Aspects of the disclosure relate to an anti-dive bar system that includes a first bar with a first floating end and a first fixed end mechanically coupled to a first axle. The anti-dive bar system further includes a second bar with a second floating end and a second fixed end mechanically coupled to a second axle. The anti-dive bar system further includes a coupler with a sleeve and a locking member. The sleeve is configured to receive at least a portion of the first bar. The locking member is moveable between a retracted position in which the first floating end of the first bar is moveable relative to the sleeve and the second floating end of the second bar and an extended position in which the first floating end of the first bar is fixed relative to the sleeve and the second floating end of the second bar.

21 Claims, 11 Drawing Sheets

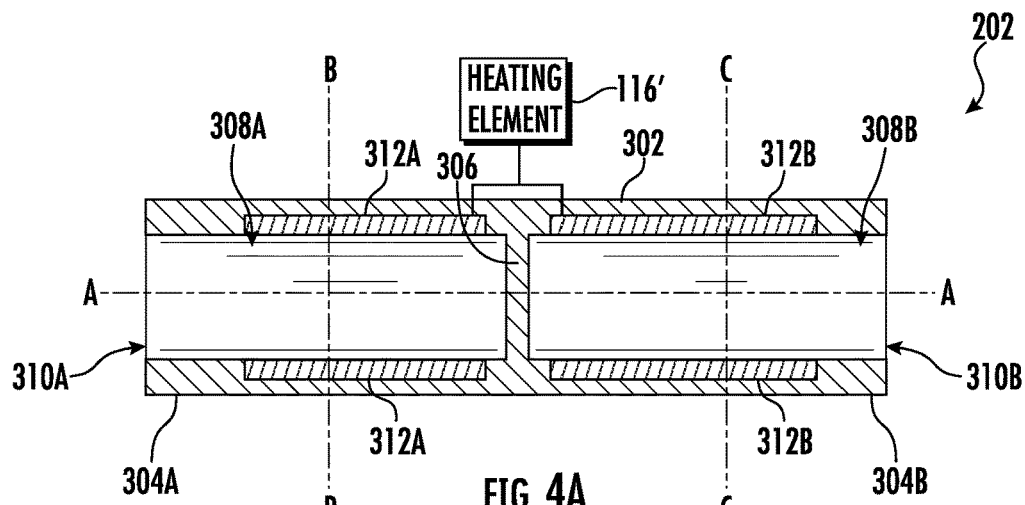
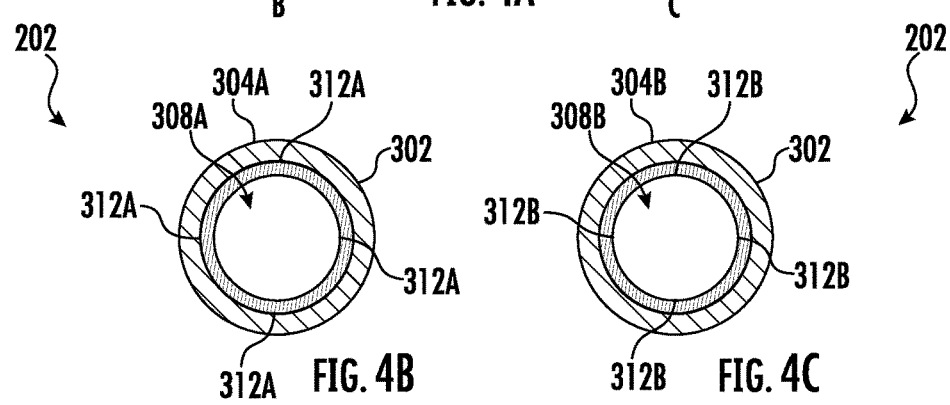
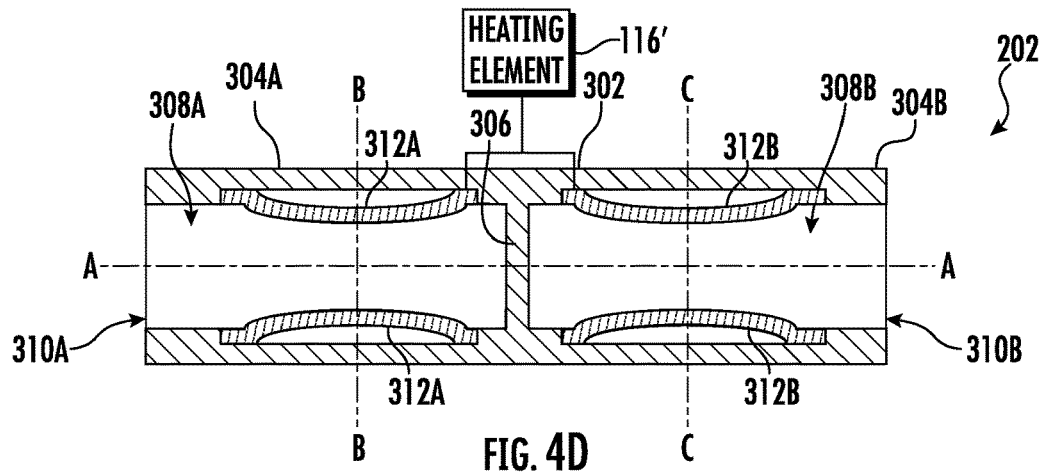
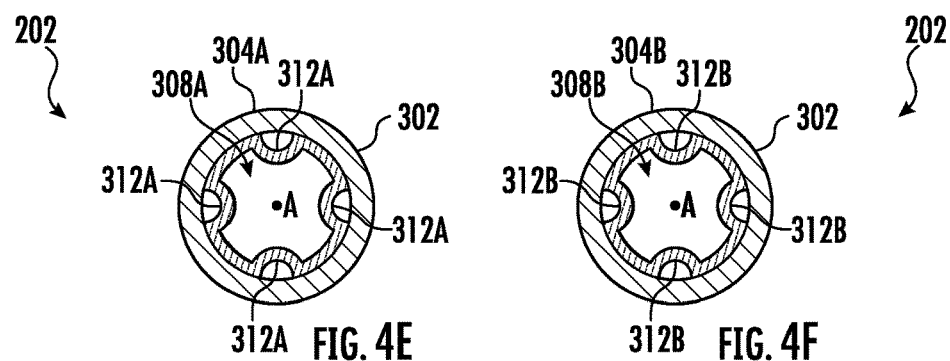

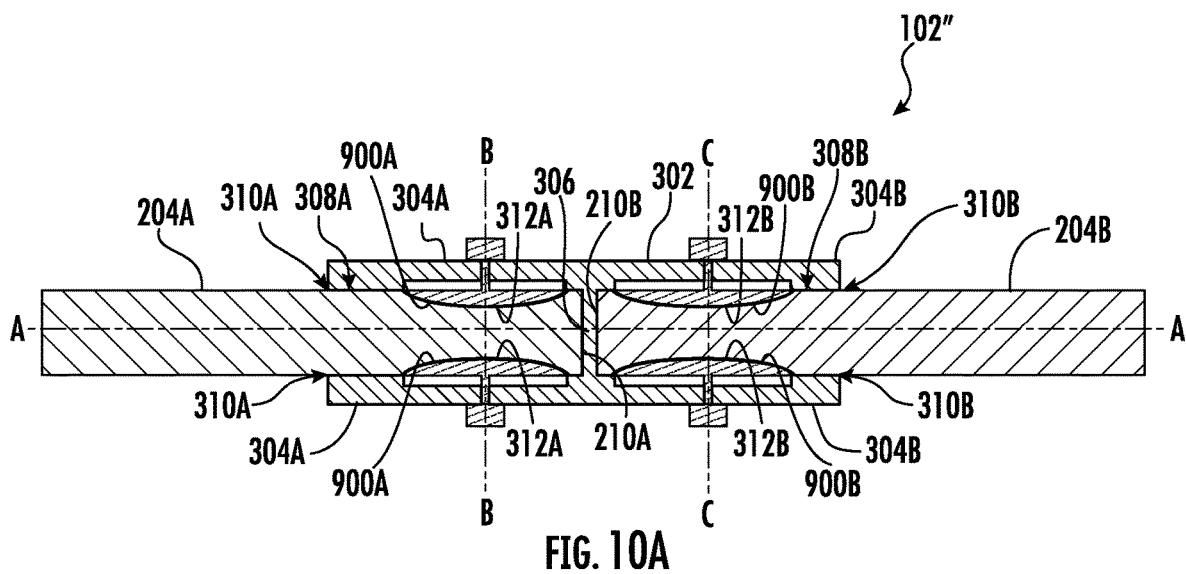
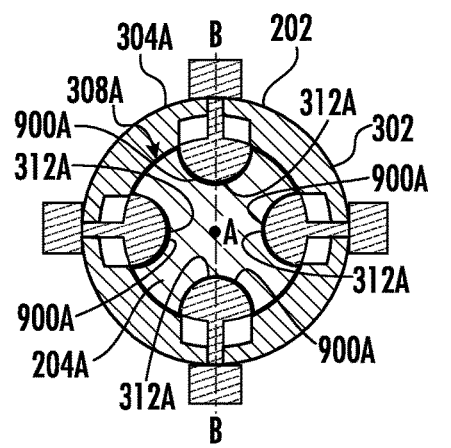 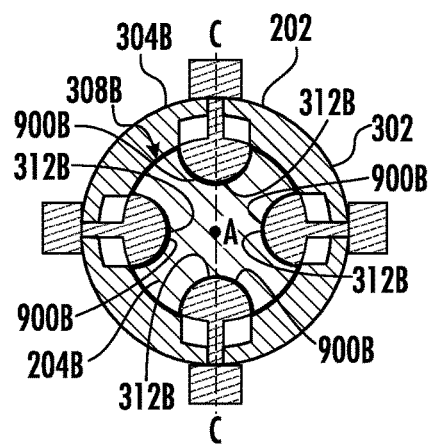
FIG. 10A
FIG. 10B    FIG. 10C

ANTI-DIVE BAR SYSTEM WITH SELECTIVE FIXATION

FIELD OF THE DISCLOSURE

The disclosure relates generally to vehicles. In particular aspects, the disclosure relates to an anti-dive bar with selective fixation.

BACKGROUND

During braking, load transfer drastically shifts normal load from the rear of the vehicle to the front of the vehicle, which can result in lowering of the front end of the vehicle, commonly referred to as diving. This requires brake designs to be large in the front and the rear of the vehicle, thereby increasing the weight and complexity of the braking system design to counteract dynamic loads due to diving. Accordingly, diving considerations limit designs and improvements in braking systems.

SUMMARY

According to an aspect of the disclosure, an anti-dive bar system includes a first bar with a first floating end and a first fixed end opposite the first floating end. The first fixed end is configured to mechanically couple to a first axle. The anti-dive bar system further includes a second bar with a second floating end and a second fixed end opposite the second floating end. The second fixed end is configured to mechanically couple to a second axle. The anti-dive bar system further includes a coupler with a sleeve and a locking member. The sleeve is configured to receive at least a portion of the first bar. The locking member is moveable between a retracted position in which the first floating end of the first bar is moveable relative to the sleeve and the second floating end of the second bar; and an extended position in which the first floating end of the first bar is fixed relative to the sleeve and the second floating end of the second bar.

In certain embodiments, with the locking member in the retracted position, the first floating end of the first bar is able to rotate and axially translate relative to the sleeve and the second floating end of the second bar. In certain embodiments, the sleeve is configured to receive at least a portion of the second bar. With the locking member in the retracted position, the second floating end of the second bar is moveable relative to the sleeve. With the locking member in the extended position, the second floating end of the second bar is fixed relative to the sleeve. In certain embodiments, with the locking member in the retracted position, the first floating end of the first bar and the second floating end of the second bar are able to rotate and axially translate relative to the sleeve. In certain embodiments, with the locking member in the retracted position, the second floating end of the second bar is fixed relative to the sleeve.

In certain embodiments, the locking member includes an actuated valve. In certain embodiments, the locking member includes a shape memory alloy. In certain embodiments, the anti-dive bar system further includes a heating element configured to selectively heat the locking member. In certain embodiments, the locking member of the coupler further includes a plurality of locking members circumferentially spaced around an interior surface of the sleeve of the coupler. Each of the plurality of locking members is moveable between the retracted position and the extended position. In certain embodiments, the locking member of the coupler further includes a first plurality of locking members circumferentially spaced around an interior surface of the sleeve of the coupler. The first plurality of locking members is configured to engage at least a portion of the first bar. The locking member of the coupler further includes a second plurality of locking members circumferentially spaced around the interior surface of the sleeve of the coupler. The second plurality of locking members is configured to engage at least a portion of the second bar.

In certain embodiments, the first floating end of the first bar is axially offset from the first fixed end of the first bar. In certain embodiments, the first bar further includes a first floating end portion with the first floating end. The first bar further includes a first fixed end portion with the first fixed end. The first fixed end portion is axially offset from the first floating end portion. The first bar further includes an intermediate portion extending between the first floating end portion and the first fixed end portion. In certain embodiments, the first floating end includes a first plurality of recesses circumferentially spaced around at least a portion of the first floating end. In certain embodiments, the second floating end includes a second plurality of recesses circumferentially spaced around at least a portion of the first floating end. In certain embodiments, each of the first plurality of recesses of the first bar is defined by an axially extending curvature. The locking member includes a first plurality of locking members. Each locking member is defined, in the extended position, by an axially extending curvature corresponding to the axially extending curvature of the first plurality of recesses of the first bar. In certain embodiments, each of the first plurality of recesses of the first bar is defined by a circumferentially extending curvature. The locking member includes a first plurality of locking members. Each locking member is defined, in the extended position, by a circumferentially extending curvature corresponding to the circumferentially extending curvature of the first plurality of recesses of the first bar.

In certain embodiments, the anti-dive bar system further includes a control unit configured to receive sensor measurements from at least one sensor, measuring a control line pressure. The control unit is further configured to determine the control line pressure exceeds a predetermined threshold. The control unit is further configured to transmit a signal for the locking member of the coupler to move to the extended position.

In another aspect of the disclosure, a vehicle includes a chassis, a first axle attached to the chassis, a second axle attached to the chassis, a vehicle body mounted to the chassis, and an anti-dive bar system. The anti-dive bar system includes a first bar with a first floating end and a first fixed end opposite the first floating end. The first fixed end is configured to mechanically couple to the first axle. The anti-dive bar system further includes a second bar with a second floating end and a second fixed end opposite the second floating end. The second fixed end is configured to mechanically couple to the second axle. The anti-dive bar system further includes a coupler including a sleeve and a locking member, the sleeve configured to receive at least a portion of the first bar. The locking member is moveable between a retracted position in which the first floating end of the first bar is moveable relative to the sleeve and the second floating end of the second bar and an extended position in which the first floating end of the first bar is fixed relative to the sleeve and the second floating end of the second bar.

In another aspect of the disclosure, a method includes receiving, at a control unit, sensor measurements from at least one sensor measuring a control line pressure of a vehicle. The vehicle includes a first bar mechanically coupled to a first axle, a second bar mechanically coupled to a second axle, and a coupler with a sleeve and a locking member. The locking member is in a retracted position in which a first floating end of the first bar is moveable relative to the sleeve and a second floating end of the second bar. The method further includes determining, by the control unit, the control line pressure exceeds a predetermined threshold. The method further includes transmitting, by the control unit, a signal for a locking member of a coupler to move from the retracted position to an extended position in which the first floating end of the first bar is fixed relative to the sleeve and the second floating end of the second bar.

In certain embodiments, the method further includes receiving, by a heating element, the signal from the control unit. The method further includes heating by the heating element, the locking member, to move the locking member from the retracted position to the extended position. In certain embodiments, the method further includes receiving, by the coupler, the signal from the control unit. The method further includes moving, by the coupler, the locking member from the retracted position to the extended position. The locking member includes an actuated valve.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding and are incorporated in and constitute a part of this specification. The drawings illustrate one or more embodiment(s), and together with the description, serve to explain the principles and operation of the various embodiments.

BRIEF DESCRIPTION OF THE DRAWINGS

The accompanying drawing figures incorporated in and forming a part of this specification illustrate several aspects of the disclosure, and together with the description, serve to explain the principles of the disclosure.

FIG. 4A is a cross-sectional side view of the coupler of FIGS. 3A-3C are in a retracted position to allow translation and rotation of the first bar and the second bar relative to the coupler;

FIG. 4B is a cross-sectional view of a first portion of the coupler of FIG. 4A with locking members in a retracted position;

FIG. 4C is a cross-sectional view of a second portion of the coupler of FIG. 4A with locking members in a retracted position;

FIG. 4D is a cross-sectional side view of the coupler of FIG. 4A in an extended position to fix the first bar and the second bar relative to the coupler;

FIG. 4E is a cross-sectional view of a first portion of the coupler of FIG. 4A with locking members in an extended position;

FIG. 4F is a cross-sectional view of a second portion of the coupler of FIG. 4A with locking members in an extended position;

FIG. 10A is a cross-sectional side view of another embodiment of the anti-dive bar system of FIG. 9A using pistons;

FIG. 10B is a cross-sectional view of a first portion of the coupler of FIG. 10A with locking members in a retracted position;

FIG. 10C is a cross-sectional view of a second portion of the coupler of FIG. 10A with locking members in a retracted position.

DETAILED DESCRIPTION

Figure 1:
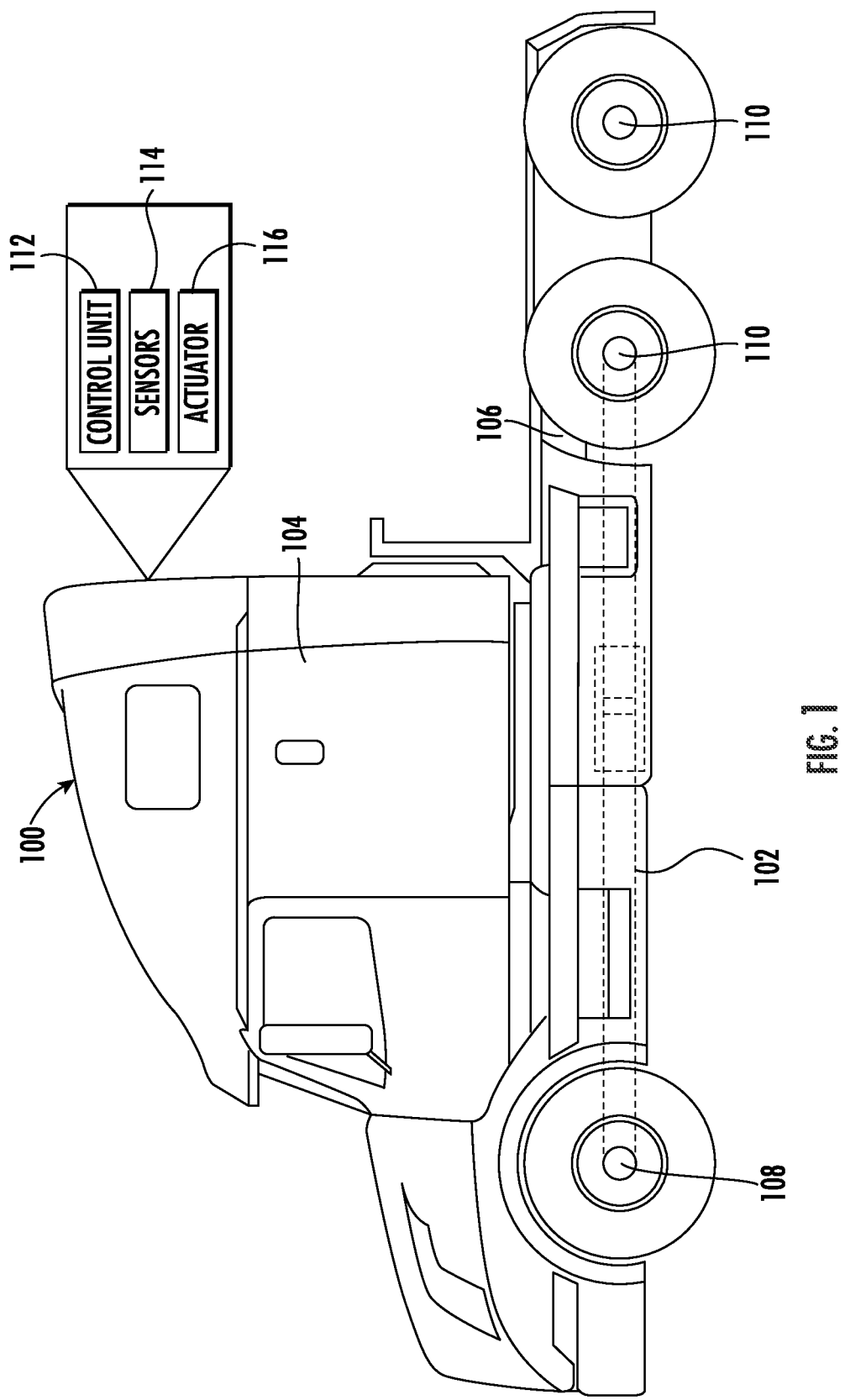
FIG. 1 is a side view of a vehicle with an anti-dive bar system according to the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

FIG. 1 is a view of a vehicle 100 with an anti-dive bar system 102. The vehicle 100 further includes a vehicle body 104 (may also be referred to as a cab body) and a chassis 106 (may also be referred to as a vehicle frame), including a front axle 108 (may be referred to as a first axle) and two rear axles 110 (may be referred to as a second axle). Although the vehicle 100 shown is a truck, it is noted that the anti-dive bar system 102 may be used on other types of vehicles. In normal driving conditions (during vehicle movement), the anti-dive bar system 102 allows relative movement of the front axle 108 and the rear axle 110, which are able to move up and down (e.g., relative to each other), facilitating a suspension system for comfort, stability, and traction. However, during a sudden deceleration above a predetermined threshold (i.e., braking event), the anti-dive bar system 102 provides a solid link between the front axle 108 and the rear axle 110, thereby preventing relative movement therebetween. Doing so prevents diving of the vehicle 100 and reduces shift in the dynamic load of the vehicle 100 from the rear axle 110 to the front axle 108.

The vehicle 100 includes a control unit 112, sensors 114, and an actuator 116 (e.g., heating element, pneumatic actuator, solenoid actuator, etc.). In certain embodiments, the control unit 112 is configured to receive sensor measurements from at least one sensor 114 measuring a control line pressure. The control unit 112 is configured to determine whether the control line pressure exceeds a predetermined threshold. Upon determining the control line pressure exceeds a predetermined threshold, the control unit 112 is configured to transmit a signal for an actuator 116 to move from a retracted to an extended position.

Figure 2A:
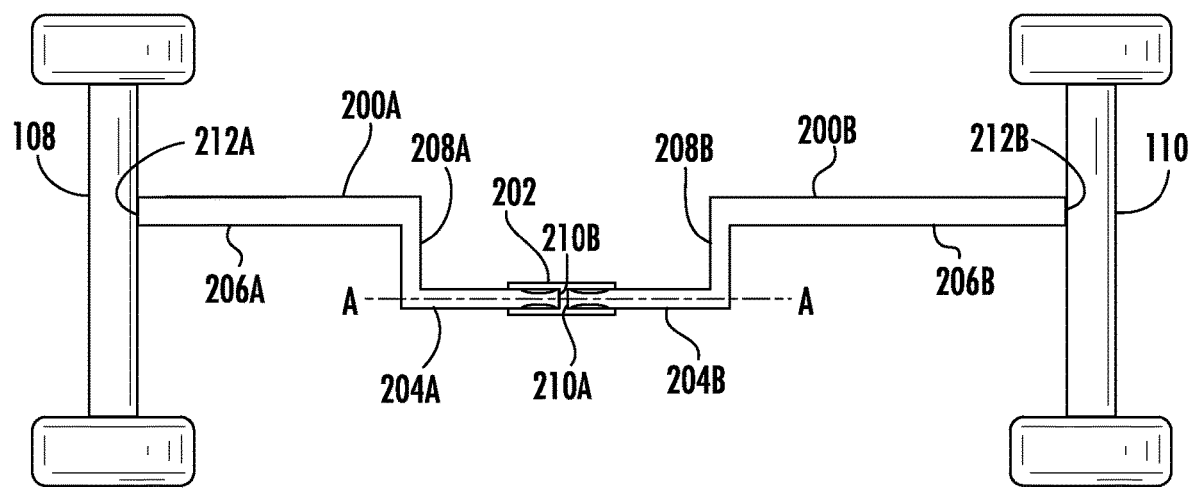
FIG. 2A is a top view of the anti-dive bar system attached to a first axle and a second axle of the vehicle of FIG. 1.
Figure 2B:
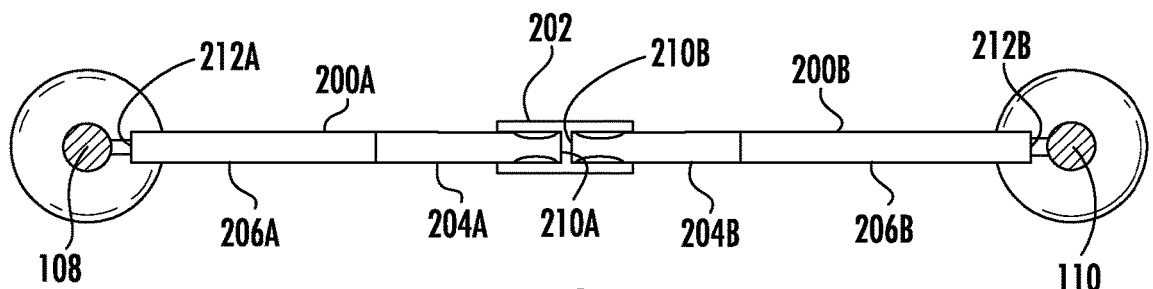
FIG. 2B is a side view of the anti-dive bar system of FIG. 2A.

FIGS. 2A-2B are views of the anti-dive bar system 102, including a first bar 200A (e.g., front bar), a second bar 200B (e.g., a rear bar), and a coupler 202 configured to receive at least a portion of the first bar 200A and/or at least a portion of the second bar 200B. The first bar 200A, the second bar 200B, and the coupler 202 link the front axle 108 and the rear axle 110 to each other. However, the coupler 202 does not provide a solid link between the front axle 108 and the rear axle 110 in normal operation until a braking condition. Accordingly, in normal driving conditions, the front axle 108 and the rear axle 110 are able to move up and down (e.g., relative to each other), facilitating a suspension system for comfort, stability, and traction. However, during a braking event (e.g., sensor 114 measures a control line pressure beyond a predetermined threshold), the actuator 116 embodied as a heating element 116' actuates the coupler 202 to provide a solid link between the front axle 108 and the rear axle 110, thereby reducing the shift in the dynamic load from the rear axle 110 to the front axle 108.

The first bar 200A includes a first floating end portion 204A, a first fixed end portion 206A, and a first intermediate portion 208A extending between the first floating end portion 204A and the first fixed end portion 206A. The first floating end portion 204A includes a first floating end 210A. The first fixed end portion 206A includes a first fixed end 212A opposite the first floating end 210A. The first fixed end 212A is mechanically coupled to a front axle 108. The first fixed end portion 206A is axially offset from the first floating end portion 204A. In other words, the first floating end 210A of the first bar 200A is axially offset from the first fixed end 212A of the first bar 200A. In certain embodiments, the first intermediate portion 208A extends generally perpendicularly to the first floating end portion 204A and the first fixed end portion 206A.

The second bar 200B includes a second floating end portion 204B, a second fixed end portion 206B, and a second intermediate portion 208B extending between the second floating end portion 204B and the second fixed end portion 206B. The second floating end portion 204B includes a second floating end 210B. The second fixed end portion 206B includes a second fixed end 212B opposite the second floating end 210B. The second fixed end 212B is mechanically coupled to a rear axle 110. The second fixed end portion 206B is axially offset from the second floating end portion 204B. In other words, the second floating end 210B of the second bar 200B is axially offset from the second fixed end 212B of the second bar 200B. In certain embodiments, the second intermediate portion 208B extends generally perpendicularly to the second floating end portion 204B and the second fixed end portion 206B.

The coupler 202 receives at least a portion of the first floating end portion 204A of the first bar 200A and at least a portion of the second floating end portion 204B of the second bar 200B. The coupler 202, the first floating end portion 204A, and the second floating end portion 204B are aligned along axis A. The first bar 200A and/or the second bar 200B are configured to move relative to each other and/or the coupler 202 during normal operation. The coupler 202 is configured to selectively fix the first bar 200A and/or the second bar 200B during a braking event.

Figure 3A:
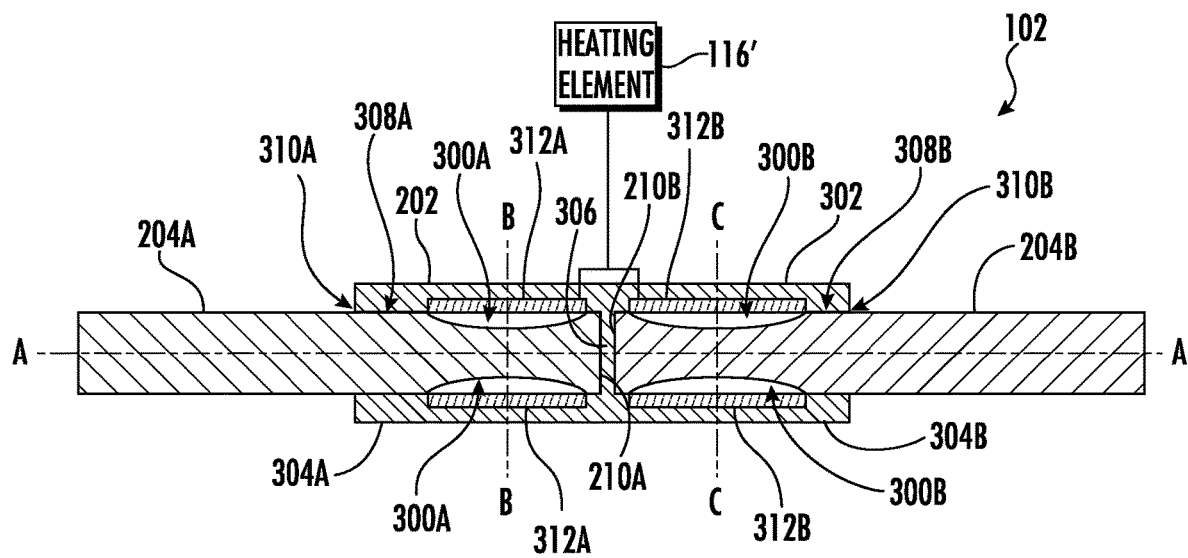
FIG. 3A is a cross-sectional side view of a coupler of the anti-dive bar system of FIGS. 1-2B with a first bar and a second bar partially positioned within the coupler.
Figure 3B:
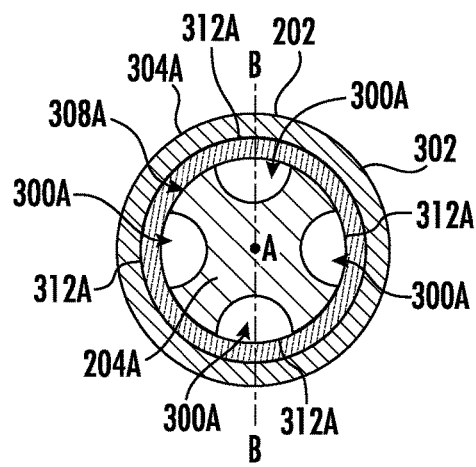
FIG. 3B is a cross-sectional view of the coupler and the first bar of the anti-dive bar system of FIG. 3A.
Figure 3C:
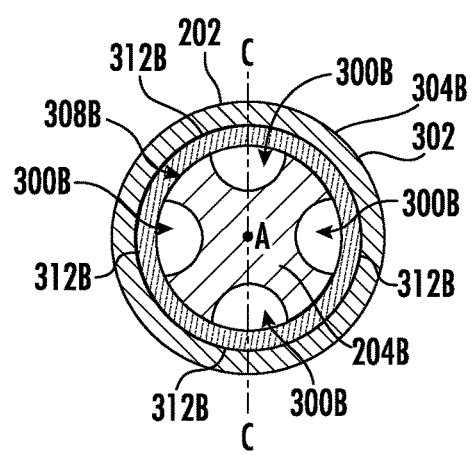
FIG. 3C is a cross-sectional view of the coupler and the second bar of the anti-dive bar system of FIG. 3A.
Figure 5A:
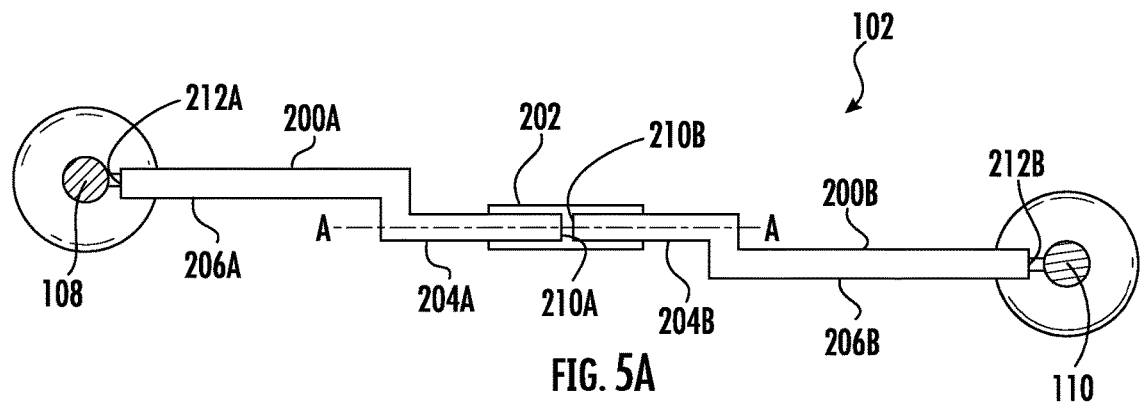
FIG. 5A is a cross-sectional side view of the anti-dive bar system of FIGS. 1-4B with an elevational translation of the first axle relative to the second axle.
Figure 5B:
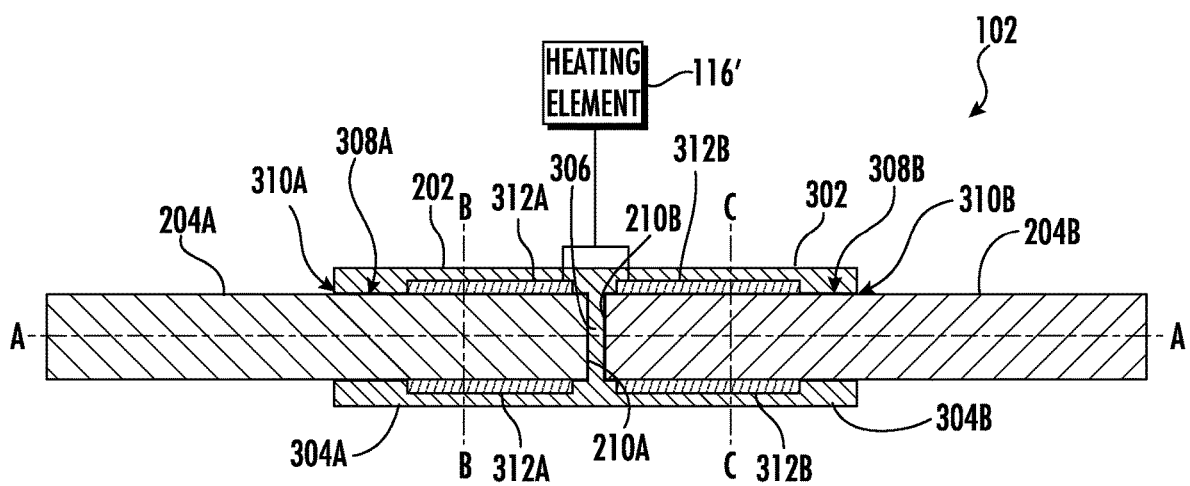
FIG. 5B is a cross-sectional side view of the anti-dive bar system of FIG. 5A illustrating rotation of the first bar and the second bar relative to the coupler in a retracted position.
Figure 5C:
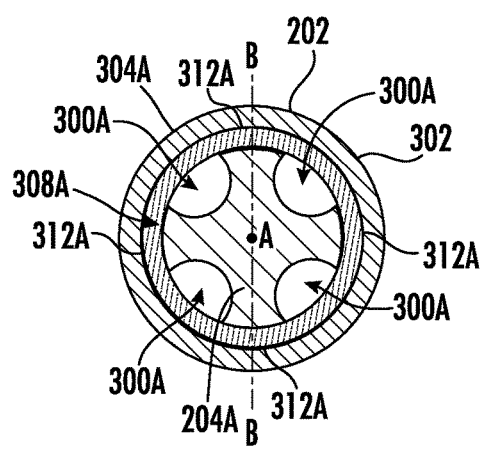
FIG. 5C is a cross-sectional view of the first bar rotated within the coupler of the anti-dive bar system of FIG. 5A.
Figure 5D:
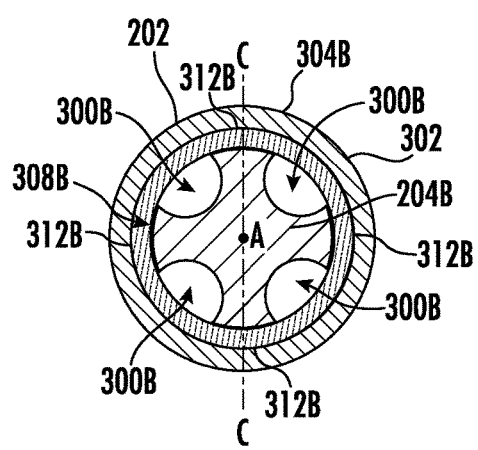
FIG. 5D is a cross-sectional view of the second bar rotated within the coupler of the anti-dive bar system of FIG. 5A.
Figure 6A:
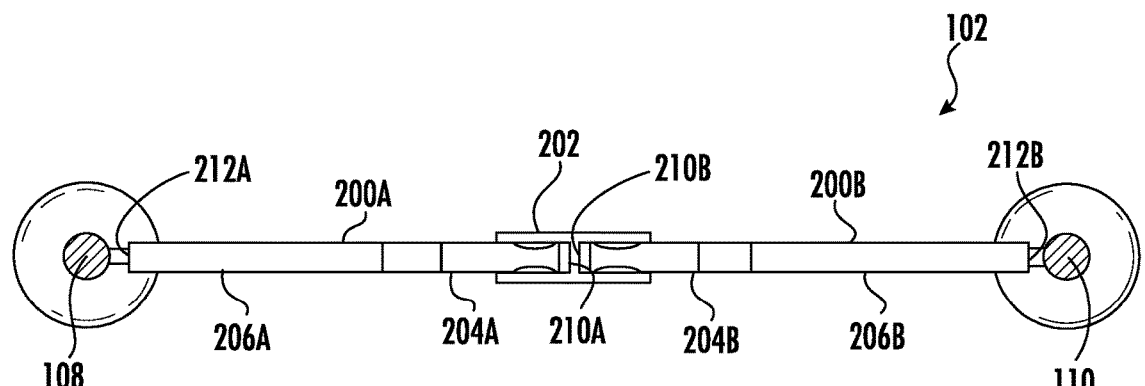
FIG. 6A is a cross-sectional side view of the anti-dive bar system of FIGS. 1-4B with an axial translation of the first axle relative to the second axle.
Figure 6B:
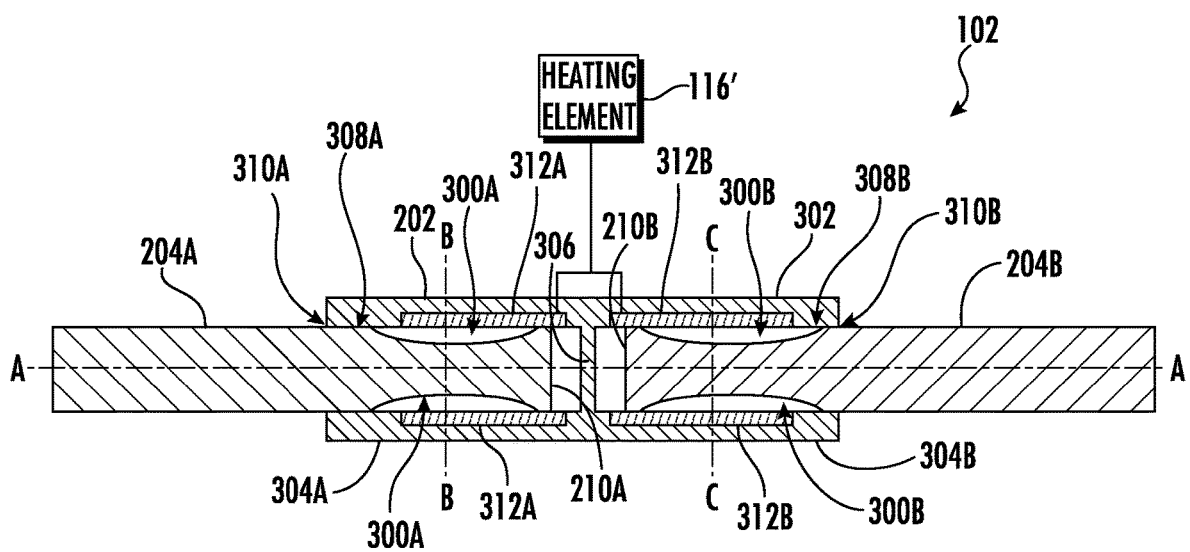
FIG. 6B is a cross-sectional side view of the anti-dive bar system of FIG. 6A illustrating translation of the first bar and the second bar relative to the coupler in a retracted position.
Figure 6C:
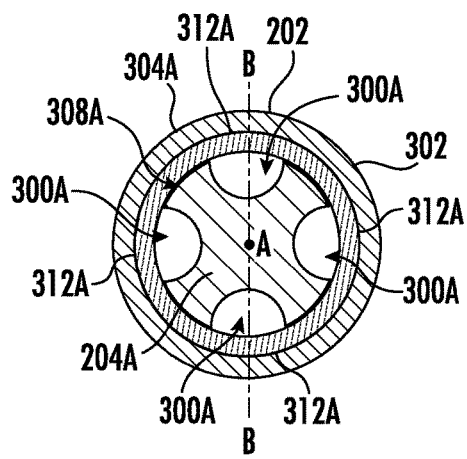
FIG. 6C is a cross-sectional view of the first bar translated within the coupler of the anti-dive bar system of FIG. 6A.
Figure 6D:
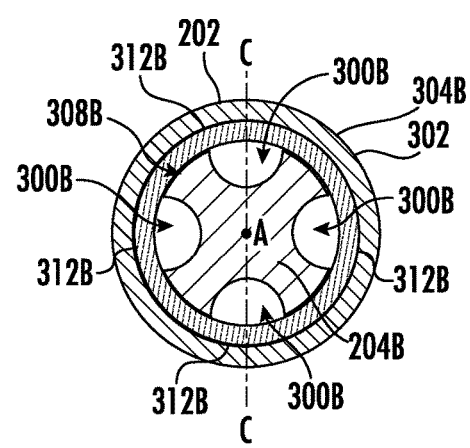
FIG. 6D is a cross-sectional view of the second bar translated within the coupler of the anti-dive bar system of FIG. 6A.

FIGS. 3A-3C are views of a coupler of the anti-dive bar system 102 with a first bar 200A and a second bar 200B partially positioned within the coupler 202.

The first floating end portion 204A is generally cylindrical with a first plurality of recesses 300A circumferentially spaced (e.g., 0°, 90°, 180°, 270°) around at least a portion of the first floating end portion 204A. Each of the first plurality of recesses 300A of the first bar 200A is defined by an axially extending curvature and/or a circumferentially extending curvature (e.g., concave curvature). In other words, the first plurality of recesses 300A is defined by one or more curvatures. In particular, each recess 300A has an axially extending length less than a length of the front portion 304A of the sleeve 302. In certain embodiments, the curvature defining each recess 300A is deepest at axis B and becomes shallower symmetrically along axis A both toward the first floating end 210A and the first fixed end 212A. Accordingly, the axially extending curvature defining each recess 300A is shallowest toward the wall 306 (and the first floating end 210A) and shallowest toward the front opening 310A of the sleeve 302. The curvature defining each recess 300A is also symmetrical circumferentially about axis A. In other words, circumferentially (e.g., going clockwise), a depth of each recess 300A starts shallow, becomes deeper, and then becomes shallow again.

The second floating end portion 204B is generally cylindrical with a second plurality of recesses 300B circumferentially spaced (e.g., 0°, 90°, 180°, 270°) around at least a portion of the second floating end portion 204B. Each of the second plurality of recesses 300B of the second bar 200B is defined by an axially extending curvature and/or a circumferentially extending curvature (e.g., concave curvature). In other words, the first plurality of recesses 300B is defined by one or more curvatures. In particular, each recess 300B has an axially extending length less than a length of the rear portion 304B of the sleeve 302. In certain embodiments, the curvature defining each recess 300B is deepest at axis C and becomes shallower symmetrically along axis A both toward the second floating end 210B and the second fixed end 212B. Accordingly, the axially extending curvature defining each recess 300B is shallowest toward the wall 306 (and the second floating end 210B) and shallowest toward the rear opening 310B of the sleeve 302. The curvature defining each recess 300B is also symmetrical circumferentially about axis A. In other words, circumferentially (e.g., going clockwise), a depth of each recess 300B starts shallow, becomes deeper, and then becomes shallow again.

Although the recesses 300A, 300B are defined by curvatures, it is noted that the recesses 300A, 300B could be tapered (instead of curved).

The coupler 202 is generally cylindrical and extends along a central axis A. The coupler 202 includes a sleeve 302 with a front portion 304A and a rear portion 304B. The sleeve 302 is configured to receive at least a portion of the first bar 200A and/or the second bar 200B. The coupler 202 includes a wall 306 within the sleeve 302 that separates the front portion 304A from the rear portion 304B. The front portion 304A defines a front channel section 308A with a front opening 310A. The rear portion 304B defines a rear channel section 308B with a rear opening 310B. The wall 306 within the sleeve 302 separates the front channel section 308A from the rear channel section 308B. The sleeve 302 is configured to receive at least a portion of the first bar 200A within the front channel section 308A (and the front opening 310A), and/or at least a portion of the second bar 200B within the rear channel section 308B (and the rear opening 310B).

The sleeve 302 includes locking members 312A, 312B, which may be integral to or separate from a body of the sleeve 302. In certain embodiments, the locking members 312A, 312B bulge or flex between a retracted position and an extended position. For example, in certain embodiments, the locking members 312A, 312B include a shape memory alloy configured to bulge or flex upon heating thereof. In certain embodiments, the locking members 312A, 312B move between a retracted position and an extended position. For example, in certain embodiments, the locking members 312A, 312B are pistons configured to move upon actuation (e.g., electric, pneumatic, etc.).

The front portion 304A of the sleeve 302 includes a front set of locking members 312A positioned within the front channel section 308A and extending inwardly therefrom. Each of the locking members 312A is configured to move from a retracted position to an extended position to engage at least a portion of the first bar 200A. The rear portion 304B of the sleeve 302 includes a rear set of locking members 312B positioned within the rear channel section 308B and extending inwardly therefrom. Each of the locking members 312A is configured to move from a retracted position to an extended position to engage at least a portion of the first bar 200A. The locking members 312A, 312B are positioned circumferentially (e.g., 0°, 90°, 180°, 270°) around the central axis A. Each of the locking members 312A, 312B are circumferentially spaced (e.g., 0°, 90°, 180°, 270°) around an interior surface of the sleeve 302 of the coupler 202. Each of the locking members 312A, 312B are moveable between the retracted position and the extended position. For example, in certain embodiments, the locking members 312A, 312B include shape memory allow and are moveable by a heating element. In other embodiments, the locking members 312A, 312B are pneumatic or solenoid valves.

Although four recesses 300A, 300B and locking members 312A, 312B are shown for each set, more or fewer locking members 312A, 312B may be used. Depending on rotational sensitivity and the accuracy required for rotational engagement, more recesses 300A, 300B, and/or locking members 312A, 312B may be used. Generally, thinner locking members 312A, 312B facilitate engagement at more degrees of rotation.

FIGS. 4A-4F are views of the coupler 202 of the anti-dive bar system 102 illustrating movement of the locking members 312A, 312B between the retracted position and the extended position. In certain embodiments, the locking member 312A, 312B includes a shape memory alloy or an actuated valve (e.g., pneumatic valve, solenoid valve, etc.). In certain embodiments, the locking member 312A, 312B includes a shape memory alloy, and the heating element 116' is configured to selectively heat the locking member 312A, 312B to move the locking member 312A, 312B between a retracted position and an extended position.

Referring to FIGS. 4A-4C, in the retracted position, the first floating end portion 204A (and the first floating end 210A) of the first bar 200A is moveable relative to the sleeve 302 and the second floating end portion 204B (and the second floating end 210B) of the second bar 200B (see, e.g., FIGS. 3A-3C). In the retracted position, each locking member 312A, 312B is flush with and is defined by a curvature the same or similar to an interior surface of the sleeve 302. In other words, the interior surface of the sleeve 302 and the locking members 312A, 312B in the retracted position form a circle.

Referring to FIGS. 4D-4F, in the extended position, the first floating end portion 204A (and the first floating end 210A) of the first bar 200A and the second floating end portion 204B (and the second floating end 210B) of the second bar 200B is fixed relative to the sleeve 302 (see, e.g., FIGS. 3A-3C). In the extended position, each locking member 312A, 312B is not flush with and is defined by a curvature (e.g., convex curvature) inconsistent with an interior surface of the sleeve 302. In other words, the interior surface of the sleeve 302 and the locking members 312A, 312B in the extended position do not form a circle.

Each locking member 312A has an axially extending length less than a length of the front portion 304A of the sleeve 302. In certain embodiments, the curvature defining each locking member 312A is greatest at axis B and becomes shallower symmetrically along axis A both toward the wall 306 and toward the front opening 310A of the sleeve 302. The curvature defining each locking member 312A is symmetrical circumferentially about axis A. In other words, each locking member 312A is defined by a curvature that corresponds with the curvature of recess 300A.

Each locking member 312B has an axially extending length less than a length of the rear portion 304B of the sleeve 302. In certain embodiments, the curvature defining each locking member 312B is greatest at axis C and becomes shallower symmetrically along axis A both toward the wall 306 and toward the rear opening 310B of the sleeve 302. The curvature defining each locking member 312B is symmetrical circumferentially about axis A. In other words, each locking member 312B is defined by a curvature that corresponds with the curvature defining recess 300B.

FIGS. 5A-5D are views of the anti-dive bar system 102 with an elevational translation of the front axle 108 relative to the rear axle 110. In particular, for example, the first fixed end portion 206A is rotationally offset from the first floating end portion 204A and the sleeve 302, and the second fixed end portion 206B is rotationally offset from the second floating end portion 204B and the sleeve 302. In the retracted position, the first floating end 210A of the first bar 200A and the second floating end 210B of the second bar 200B are able to rotate relative to each other and rotate within and relative to the sleeve 302. Accordingly, the recesses 300A of the first bar 200A are rotationally offset relative to the locking members 312A of the coupler 202, and/or the recesses 300B of the second bar 200B are rotationally offset relative to the locking members 312B of the coupler 202. The linkage between the front axle 108 and the rear axle 110 is not solid.

FIGS. 6A-6D are views of the anti-dive bar system 102 with an axial translation of the front axle 108 relative to the rear axle 110. In particular, for example, the first fixed end portion 206A and the second fixed end portion 206B are axially offset from each other and/or the wall 306. In the retracted position, the first floating end 210A of the first bar 200A and the second floating end 210B of the second bar 200B are able to axially translate relative to each other and axially translate within and relative to the sleeve 302. Accordingly, the recesses 300A of the first bar 200A are axially offset relative to the locking members 312A of the coupler 202, and/or the recesses 300B of the second bar 200B are axially offset relative to the locking members 312B of the coupler 202.

Figure 7A:
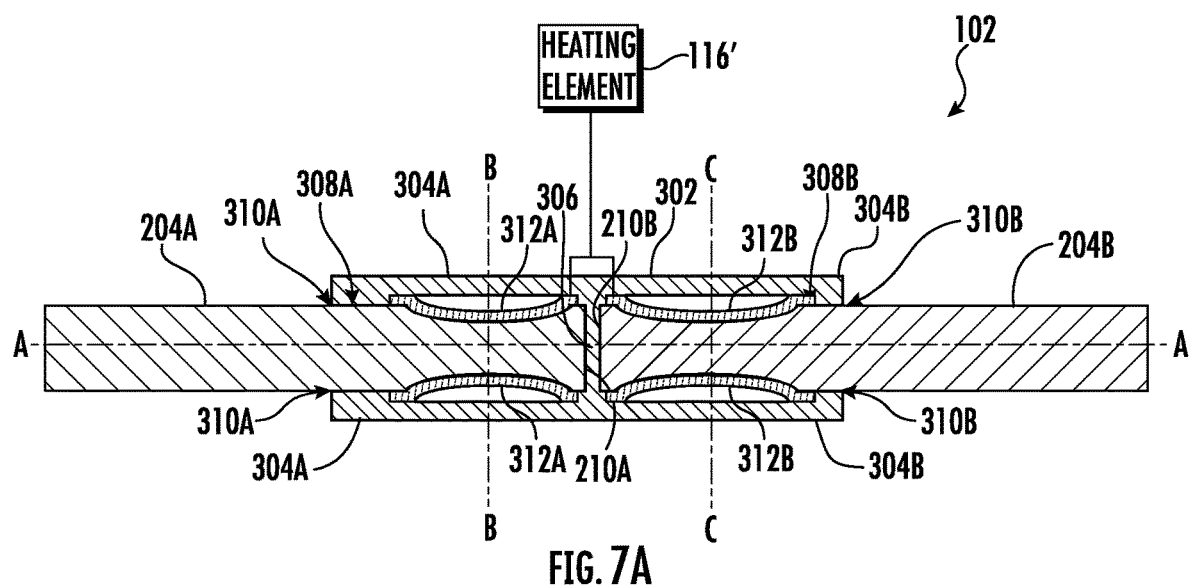
FIG. 7A is a cross-sectional side view of the anti-dive bar system of FIGS. 1-4B with the coupler in an extended position fixing the first bar and the second bar relative to the coupler.
Figures 7B, 7C:
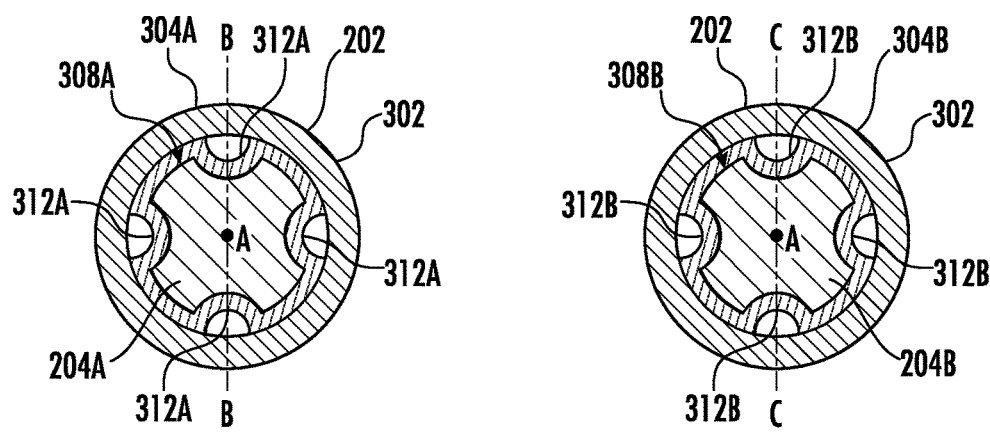
FIG. 7B is a cross-sectional view of the first bar fixed within the coupler of the anti-dive bar system of FIG. 7A.
FIG. 7C is a cross-sectional view of the second bar fixed within the coupler of the anti-dive bar system of FIG. 7A.

FIGS. 7A-7C are views of the anti-dive bar system 102 with the coupler 202 in an extended position fixing the first bar 200A and the second bar 200B relative to the coupler 202. In the extended position, the first floating end 210A of the first bar 200A and/or the second floating end 210B of the second bar 200B is fixed relative to the sleeve 302. In particular, the locking members 312A of the coupler 202 are in an extended position and engaged with the recesses 300A of the first bar 200A, and/or the locking members 312B of the coupler 202 are in an extended position and engaged with the recesses 300B of the second bar 200B.

The corresponding curvatures defining the locking members 312A, 312B and the recesses 300A, 300B facilitate engagement of the locking members 312A, 312B with the recesses 300A, 300B. Accordingly, the curvatures defining the locking members 312A, 312B rotationally and/or axially urge the floating end portions 204A, 204B into a fixed position relative to the sleeve 302 of the coupler 202.

Once engaged, the locking members 312A, 312B lock the bars 200A, 200B rotationally and/or axially relative to the sleeve of the coupler 202. Doing so creates a solid linkage between the front axle 108 and the rear axle 110. It is noted that even in an extended position (i.e., locked position), the front axle 108 and rear axle 110 may still move in elevation relative to each other, but doing so creates a greater torque biasing the first fixed end portion 206A of the first bar 200A with the second fixed end portion 206B of the second bar 200B. Further, in a locked position, the first fixed end 212A and the second fixed end 212B abut the wall 306 of the coupler 202, supporting a direct load transfer during a braking event from the rear axle 110, through the second bar 200B, through the wall 306 of the coupler 202, through the first bar 200A, to the front axle 108.

Figure 8A:
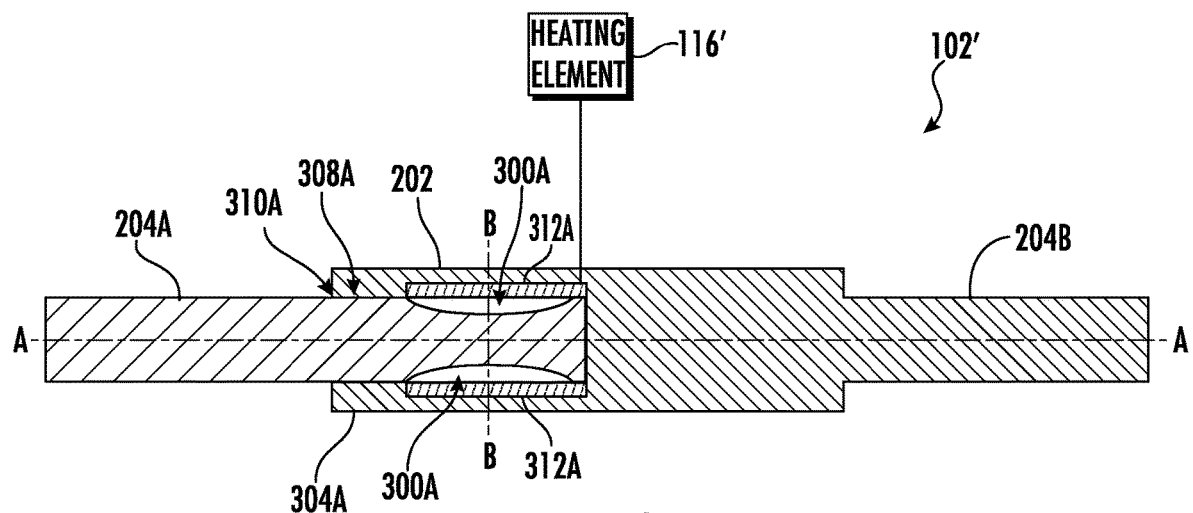
FIG. 8A is a cross-sectional side view of another embodiment of the anti-dive bar system of FIGS. 1-7C with a second bar integrally attached to the coupler.
Figure 8B:
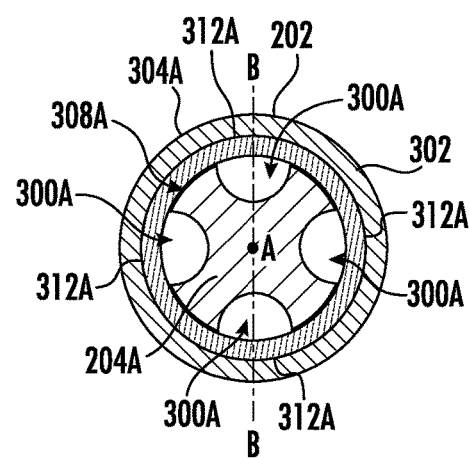
FIG. 8B is a cross-sectional view of the first bar within the coupler of the anti-dive bar system of FIG. 8A.
Figure 9A:
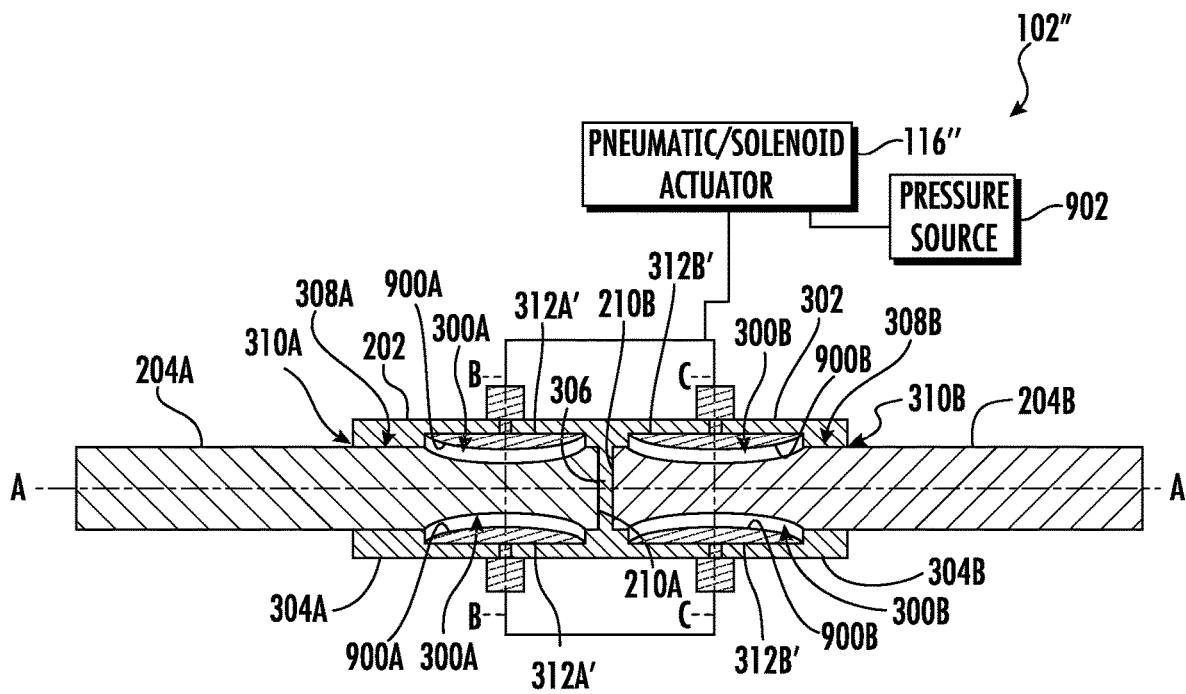
FIG. 9A is a cross-sectional side view of another embodiment of the anti-dive bar system of FIGS. 1-7C using pistons.
Figure 9B:
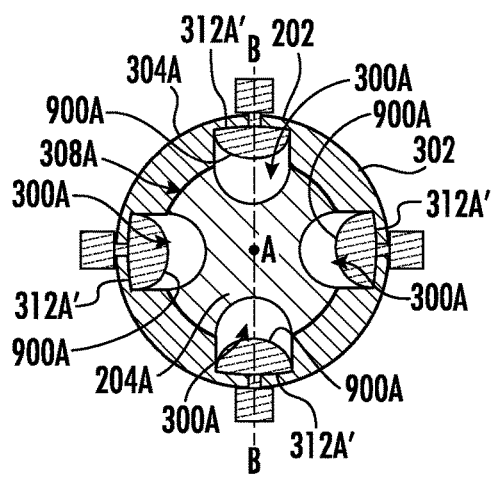
FIG. 9B is a cross-sectional view of a first portion of the coupler of FIG. 9A with locking members in a retracted position.
Figure 9C:
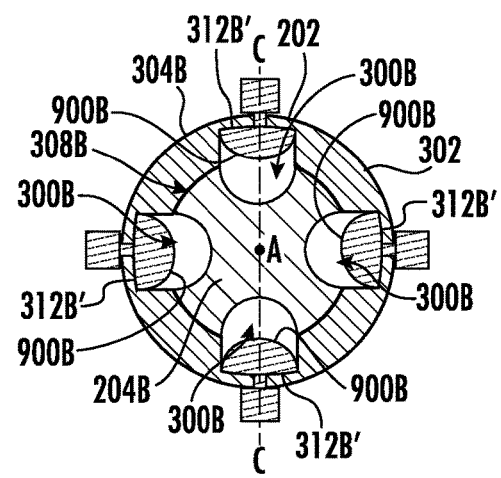
FIG. 9C is a cross-sectional view of a second portion of the coupler of FIG. 9A with locking members in a retracted position.

FIGS. 8A-8B are views of another embodiment of the anti-dive bar system 102' with a second bar 200B integrally attached to the coupler 202. In such a configuration, the front axle 108 can still translate relative to the rear axle 110. Further, the floating end portion 204A of the first bar 200A can still rotate relative to the floating end portion 204B of the second bar 200B. However, the coupler 202 only includes a front channel section 308A with a front opening 310A. Further, only the first bar 200A includes a plurality of recesses 300A.

FIGS. 9A-10C are views of another embodiment of the anti-dive bar system 102" using pistons 312A', 312B' instead of memory-shaped members. The anti-dive bar system 102" operates the same as that discussed above except where otherwise noted. Each piston 312A', 312B' includes a head 900A, 900B that corresponds in size and shape to the recesses 300A, 300B of the floating end portions 204A, 204B. Further, each piston 312A', 312B' is connected to a pneumatic/solenoid actuator 116", which in turn is connected to a source 902. For example, in certain embodiments, the pneumatic actuator 116" is a pressure modulated valve and the source 902 is a pressurized source. In other embodiments, the solenoid actuator 116" is an electrical control switch, and the source 902 is a battery or other electrical source. When actuated, the head 900A, 900B of the piston 312A', 312B' engages the recess 300A, 300B to lock the floating end portions 204A, 204B.

Figure 11:
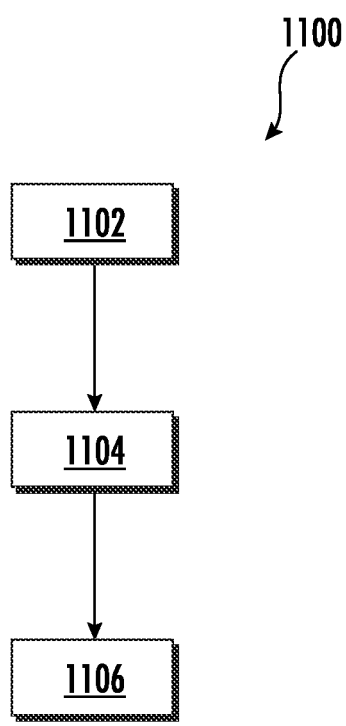
FIG. 11 is a flowchart illustrating a method of controlling the anti-dive bar system of FIGS. 1-10C.

FIG. 11 is a flowchart 1100 illustrating steps of controlling an anti-dive bar system 102. Step 1102 includes receiving, at a control unit 112, sensor measurements from at least one sensor 114 measuring a control line pressure of a vehicle 100. The vehicle 100 includes a first bar 200A mechanically coupled to a front axle 108, a second bar 200B mechanically coupled to a rear axle 110, and a coupler 202 including a sleeve 302 and a locking member 312A, 312B. The locking member 312A, 312B is in a retracted position in which a first floating end 210A of the first bar 200A is moveable relative to the sleeve 302 and a second floating end 210B of the second bar 200B. Step 1104 includes determining, by the control unit 112, that the control line pressure exceeds a predetermined threshold. Step 1106 includes transmitting, by the control unit 112, a signal for a locking member of a coupler 202 to move from the retracted position to an extended position in which the first floating end 210A of the first bar 200A is fixed relative to the sleeve 302 and the second floating end 210B of the second bar 200B.

In certain embodiments, the method further includes receiving, by a heating element, the signal from the control unit 112. The method further includes heating, by the heating element, the locking member 312A, 312B to move the locking member 312A, 312B from the retracted position to the extended position. In certain embodiments, the method further includes receiving, by the coupler 202, the signal from the control unit 112. The method further includes moving, by the coupler 202, the locking member 312A, 312B from the retracted position to the extended position. The locking member 312A, 312B includes an actuated valve.

Those skilled in the art will recognize improvements and modifications to the preferred embodiments of the present disclosure. All such improvements and modifications are considered within the scope of the concepts disclosed herein and the claims that follow.

What is claimed is:

1. An anti-dive bar system, comprising:
   a first bar comprising a first floating end and a first fixed end opposite the first floating end, the first fixed end configured to mechanically couple to a first axle; and
   a second bar comprising a second floating end and a second fixed end opposite the second floating end, the second fixed end configured to mechanically couple to a second axle; and
   a coupler comprising a sleeve and a locking member, the sleeve configured to receive at least a portion of the first bar, the locking member moveable between:
      a retracted position in which the first floating end of the first bar is moveable relative to the sleeve and the second floating end of the second bar;
      an extended position in which the first floating end of the first bar is fixed relative to the sleeve and the second floating end of the second bar.

2. The anti-dive bar system of claim 1, wherein with the locking member in the retracted position, the first floating end of the first bar is able to rotate and axially translate relative to the sleeve and the second floating end of the second bar.

3. The anti-dive bar system of claim 1, wherein
   the sleeve is configured to receive at least a portion of the second bar;
   with the locking member in the retracted position, the second floating end of the second bar is moveable relative to the sleeve; and
   with the locking member in the extended position, the second floating end of the second bar is fixed relative to the sleeve.

4. The anti-dive bar system of claim 1, wherein with the locking member in the retracted position, the first floating end of the first bar and the second floating end of the second bar are able to rotate and axially translate relative to the sleeve.

5. The anti-dive bar system of claim 1, wherein with the locking member in the extended position, the second floating end of the second bar is fixed relative to the sleeve.

6. The anti-dive bar system of claim 1, wherein the locking member comprises an actuated valve.

7. The anti-dive bar system of claim 1, wherein the locking member comprises a shape memory alloy.

8. The anti-dive bar system of claim 7 further comprising a heating element configured to selectively heat the locking member.

9. The anti-dive bar system of claim 1, wherein the locking member of the coupler further comprises a plurality of locking members circumferentially spaced around an interior surface of the sleeve of the coupler, each of the plurality of locking members moveable between the retracted position and the extended position.

10. The anti-dive bar system of claim 1, wherein the locking member of the coupler further comprises:
    a first plurality of locking members circumferentially spaced around an interior surface of the sleeve of the coupler, the first plurality of locking members configured to engage at least a portion of the first bar; and
    a second plurality of locking members circumferentially spaced around the interior surface of the sleeve of the coupler, the second plurality of locking members configured to engage at least a portion of the second bar.

11. The anti-dive bar system of claim 1, wherein the first floating end of the first bar is axially offset from the first fixed end of the first bar.

12. The anti-dive bar system of claim 1, wherein the first bar further comprises:
    a first floating end portion comprising the first floating end;
    a first fixed end portion comprising the first fixed end, the first fixed end portion axially offset from the first floating end portion; and
    an intermediate portion extending between the first floating end portion and the first fixed end portion.

13. The anti-dive bar system of claim 1, wherein the first floating end comprises a first plurality of recesses circumferentially spaced around at least a portion of the first floating end.

14. The anti-dive bar system of claim 13, wherein the second floating end comprises a second plurality of recesses circumferentially spaced around at least a portion of the first floating end.

15. The anti-dive bar system of claim 13, wherein
    each of the first plurality of recesses of the first bar is defined by an axially extending curvature; and
    the locking member comprises a first plurality of locking members, each locking member defined by, in the extended position, an axially extending curvature corresponding to the axially extending curvature defining the first plurality of recesses of the first bar.

16. The anti-dive bar system of claim 13, wherein
    each of the first plurality of recesses of the first bar is defined by a circumferentially extending curvature; and
    the locking member comprises a first plurality of locking members, each locking member defined by, in the extended position, a circumferentially extending curvature corresponding to the circumferentially extending curvature defining the first plurality of recesses of the first bar.

17. The anti-dive bar system of claim 1, further comprising a control unit configured to:
receive sensor measurements from at least one sensor measuring a control line pressure;
determine the control line pressure exceeds a predetermined threshold; and
transmit a signal for the locking member of the coupler to move to the extended position.

18. A vehicle, comprising:
a chassis;
a first axle attached to the chassis;
a second axle attached to the chassis;
a vehicle body mounted to the chassis; and
an anti-dive bar system, comprising:
    a first bar comprising a first floating end and a first fixed end opposite the first floating end, the first fixed end configured to mechanically couple to the first axle; and
    a second bar comprising a second floating end and a second fixed end opposite the second floating end, the second fixed end configured to mechanically couple to the second axle; and
    a coupler comprising a sleeve and a locking member, the sleeve configured to receive at least a portion of the first bar, the locking member moveable between:
        a retracted position in which the first floating end of the first bar is moveable relative to the sleeve and the second floating end of the second bar;
        an extended position in which the first floating end of the first bar is fixed relative to the sleeve and the second floating end of the second bar.

19. A method, comprising:
receiving, at a control unit, sensor measurements from at least one sensor measuring a control line pressure of a vehicle, the vehicle comprising a first bar mechanically coupled to a first axle, a second bar mechanically coupled to a second axle, and a coupler comprising a sleeve and a locking member, the locking member in a retracted position in which a first floating end of the first bar is moveable relative to the sleeve and a second floating end of the second bar;
determining, by the control unit, the control line pressure exceeds a predetermined threshold; and
transmitting, by the control unit, a signal for a locking member of a coupler to move from the retracted position to an extended position in which the first floating end of the first bar is fixed relative to the sleeve and the second floating end of the second bar.

20. The method of claim 19, further comprising:
receiving, by a heating element, the signal from the control unit; and
heating, by the heating element, the locking member to move the locking member from the retracted position to the extended position.

21. The method of claim 19, further comprising:
receiving, by the coupler, the signal from the control unit; and
moving, by the coupler, the locking member from the retracted position to the extended position, the locking member comprising an actuated valve.

* * * * *